(12) United States Patent
Schaefer et al.

(10) Patent No.: US 8,297,191 B2
(45) Date of Patent: Oct. 30, 2012

(54) PRESSURE SEAL

(75) Inventors: Alan R. Schaefer, Bloomington, IN (US); Daniel Neff, Jasper, IN (US); Donald P. Luse, Bloomfield, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 198 days.

(21) Appl. No.: 12/533,760

(22) Filed: Jul. 31, 2009

(65) Prior Publication Data

US 2011/0023742 A1 Feb. 3, 2011

(51) Int. Cl.
F42B 5/26 (2006.01)

(52) U.S. Cl. .................................. 102/469; 277/648

(58) Field of Classification Search .................. 102/469, 102/470, 472; 277/644, 647, 624, 626, 602, 277/615, 604, 609, 568, 574, 606, 608, 616, 277/627, 560, 562, 586, 584, 530, 566, 567
See application file for complete search history.

(56) References Cited

U.S. PATENT DOCUMENTS

| | | | | |
|---|---|---|---|---|
| 740,790 A * | 10/1903 | Young et al. | ............... | 102/470 |
| 2,081,040 A | 5/1937 | King | | |
| 2,230,725 A * | 2/1941 | Nathan | ............... | 277/624 |
| 2,259,453 A * | 10/1941 | Beyer et al. | ............... | 285/105 |
| 2,272,811 A * | 2/1942 | Nathan | ............... | 277/619 |
| 2,830,858 A * | 4/1958 | Moorman et al. | ............... | 384/484 |
| 2,907,596 A * | 10/1959 | Maha | ............... | 277/566 |
| 3,020,054 A * | 2/1962 | Driancourt | ............... | 277/626 |
| 3,081,102 A * | 3/1963 | Murray et al. | ............... | 277/607 |
| 3,215,077 A * | 11/1965 | Mayer et al. | ............... | 102/469 |
| 3,279,806 A * | 10/1966 | Bialkowski | ............... | 277/647 |
| 3,573,871 A * | 4/1971 | Warner | ............... | 277/607 |
| 3,576,329 A * | 4/1971 | Weaver | ............... | 277/616 |
| 3,590,740 A * | 7/1971 | Herter | ............... | 102/466 |
| 3,720,418 A * | 3/1973 | Berg | ............... | 277/551 |
| 3,722,412 A * | 3/1973 | Herter | ............... | 102/466 |
| 3,805,702 A | 4/1974 | Voss et al. | | |
| 4,020,763 A * | 5/1977 | Iruretagoyena | ............... | 102/469 |
| 4,108,447 A * | 8/1978 | Scholin | ............... | 277/553 |
| 4,132,421 A * | 1/1979 | Corsi et al. | ............... | 277/565 |
| 4,202,270 A * | 5/1980 | Luther et al. | ............... | 102/464 |
| 4,353,304 A * | 10/1982 | Hubsch et al. | ............... | 102/470 |
| 4,371,177 A * | 2/1983 | Bahr et al. | ............... | 277/560 |
| 4,404,912 A * | 9/1983 | Sindermann | ............... | 102/505 |
| 4,417,503 A * | 11/1983 | Izumi | ............... | 277/436 |
| 4,529,211 A * | 7/1985 | Rodgers | ............... | 277/626 |
| 4,646,644 A * | 3/1987 | Richmond et al. | ............... | 102/530 |
| 4,682,545 A * | 7/1987 | Jett, Jr. | ............... | 102/430 |
| 4,738,202 A | 4/1988 | Hebert | | |
| 4,770,099 A * | 9/1988 | Brede et al. | ............... | 102/472 |
| 4,867,066 A * | 9/1989 | Buenemann, Jr. | ............... | 102/470 |
| 4,938,146 A * | 7/1990 | Gunther et al. | ............... | 102/439 |
| 5,063,853 A * | 11/1991 | Bilgeri | ............... | 102/467 |
| 5,083,128 A * | 1/1992 | Tsuji | ............... | 342/2 |

(Continued)

FOREIGN PATENT DOCUMENTS

EP 14906 A1 * 9/1980

(Continued)

*Primary Examiner* — Jonathan C Weber
(74) *Attorney, Agent, or Firm* — Christopher A. Monsey

(57) ABSTRACT

A seal is provided that restricts movement of adjacent parts when in a high pressure environment while allowing relative movement of adjacent parts when in non-high pressure environment.

10 Claims, 5 Drawing Sheets

U.S. PATENT DOCUMENTS

| | | | | |
|---|---|---|---|---|
| 5,139,274 | A * | 8/1992 | Oseman | 277/552 |
| 5,169,160 | A | 12/1992 | Gaskill et al. | |
| 5,205,568 | A * | 4/1993 | Stoll et al. | 277/615 |
| 5,297,491 | A * | 3/1994 | Sippel et al. | 102/469 |
| 5,346,230 | A * | 9/1994 | Schumacher et al. | 277/551 |
| 5,431,415 | A * | 7/1995 | Millonig et al. | 277/353 |
| 5,482,296 | A * | 1/1996 | Peppiatt et al. | 277/568 |
| 5,649,713 | A * | 7/1997 | Ledgerwood | 277/615 |
| 5,969,288 | A * | 10/1999 | Baud | 102/466 |
| 6,053,502 | A * | 4/2000 | Hallenstvedt | 277/572 |
| 6,113,108 | A * | 9/2000 | Friend et al. | 277/549 |
| 6,116,613 | A * | 9/2000 | Friend et al. | 277/549 |
| 6,189,894 | B1 * | 2/2001 | Wheeler | 277/549 |
| 6,209,882 | B1 * | 4/2001 | Riess | 277/562 |
| 6,231,051 | B1 * | 5/2001 | Mueller et al. | 277/603 |
| 6,290,235 | B1 * | 9/2001 | Albertson | 277/510 |
| 6,454,273 | B1 * | 9/2002 | Kashima et al. | 277/437 |
| 6,575,471 | B1 * | 6/2003 | Grosspietsch et al. | 277/436 |
| 6,640,943 | B1 | 11/2003 | Daws et al. | |
| 6,722,658 | B2 * | 4/2004 | Siegrist et al. | 277/436 |
| 7,090,222 | B2 * | 8/2006 | Watanabe et al. | 277/549 |
| 7,198,275 | B2 | 4/2007 | Gravier | |
| 7,717,432 | B2 * | 5/2010 | Kondo et al. | 277/353 |
| 7,770,898 | B2 * | 8/2010 | Dietle et al. | 277/559 |
| 2003/0209162 | A1 * | 11/2003 | Schmees et al. | 102/472 |
| 2006/0237916 | A1 | 10/2006 | Peter et al. | |
| 2007/0216108 | A1 | 9/2007 | Zitting et al. | |

FOREIGN PATENT DOCUMENTS

EP 104504 A1 * 4/1984

* cited by examiner

PRESSURE SEAL

STATEMENT REGARDING FEDERALLY SPONSORED RESEARCH OR DEVELOPMENT

The invention described herein includes contributions by one or more employees of the Department of the Navy made in performance of official duties and may be manufactured, used, licensed by, or for the United States Government without payment of any royalties thereon.

BACKGROUND AND SUMMARY

The present disclosure relates generally to seals. More particularly, the present disclosure relates to seals that are able to reduce pressure loss from high pressure environments while providing a lower friction interface in a non-high pressure environments.

According to one aspect of the present disclosure, an ejector device is provided including a housing, an ejectable device, and a seal. The housing having an ignition source receiving bore including a bore wall. The ejectable device is disposed within the housing. The seal has an annular forked end exposed to a pressure bore. The forked end has an outer fork and an inner fork. The forks are constructed from a material that permits deflection of the forks when the forks are exposed to high pressure within the pressure bore, deflection of the forks sealing the seal against the bore wall and against an ignition source received in the ignition source receiving bore.

According to another aspect of the present disclosure, a method of sealing an interface is provided including the step of providing a seal including a first sealing flange and a second sealing flange. The first and second sealing flanges having a forked orientation relative to each other defining an open end and defining a pressure zone between the two sealing flanges including the open end. The method further including the step of abutting the first flange to a first body and abutting the second flange to a second body. The seal permits relative movement of the first and second bodies when the pressure zone has an internal pressure approximating natural atmospheric pressure. The seal restricts relative movement of the first and second bodies when the pressure zone is infused with high pressure gas.

According to another aspect of the present disclosure, an interface sealing device is provided including a seal, a first body, and a second body. The seal includes a first sealing flange and a second sealing flange. The first and second sealing flanges have a forked orientation relative to each other defining an open end and defining a pressure zone between the two sealing flanges including the open end. The first body abuts the first flange. The second body abuts the second flange. The seal permits relative movement of the first and second bodies when the pressure zone has an internal pressure approximating natural atmospheric pressure, the seal restricting relative movement of the first and second bodies when the pressure zone is infused with high pressure gas.

According to another aspect of the present disclosure, an interface sealing device is provided including a seal adapted to selectively restrict flow of a fluid between a first body and a second body, said seal comprising a first sealing flange; and a second sealing flange; the first and second sealing flanges having a forked orientation relative to each other defining an open end and defining a pressure zone between the two sealing flanges including the open end; the seal permitting relative movement of first and second bodies abutting first and second sealing flanges, respectively, when the pressure zone has an internal pressure approximating natural atmospheric pressure, the seal restricting relative movement of the first and second bodies when the pressure zone is infused with high pressure fluid.

According to another aspect of the present disclosure, an interface sealing device is provided including a seal adapted to selectively restrict flow of a fluid between a first body and a second body, said seal comprising a first sealing flange; and a second sealing flange; the second flange having a first position permitting relative movement of the first and second bodies, the second flange having a second position substantially preventing relative movement of the first and second bodies.

According to another aspect of the present disclosure, a method of manufacturing a sealing device is provided including the steps of forming a main body; forming a first flange extending from the main body; and forming a second flange extending from the main body to form a "V" structure in combination with the first flange; the step of forming the second flange including providing the second flange with a thickness such that the second flange assumes a first position in a low pressure environment and assumes a second position in a high pressure environment, the first position permitting relative movement of first and second bodies abutting the first and second flanges, the second position providing for increased friction such that the second position second position substantially prevents relative movement of the first and second bodies.

According to another aspect of the present disclosure, a gas charge sealing structure is provided including a body defining a central axis which passes through a center of the body and including a gas charge receiving bore; a first sealing flange; and a second sealing flange, the flanges oriented substantially parallel to each other and to the central axis, the flanges cooperating to define a cavity which permits easy removal of the gas charge from the gas charge receiving bore when the body is subjected to low pressure, the flanges cooperating to prevent easy removal of the gas charge from the gas charge receiving bore when the cavity is subjected to high pressure.

Additional features of the present disclosure will become apparent to those skilled in the art upon consideration of the following detailed description of the presently perceived best mode of carrying out the disclosure.

BRIEF DESCRIPTION OF THE DRAWINGS

The detailed description of the drawings particularly refers to the accompanying figures in which.

DETAILED DESCRIPTION OF THE DRAWINGS

Figure 1:
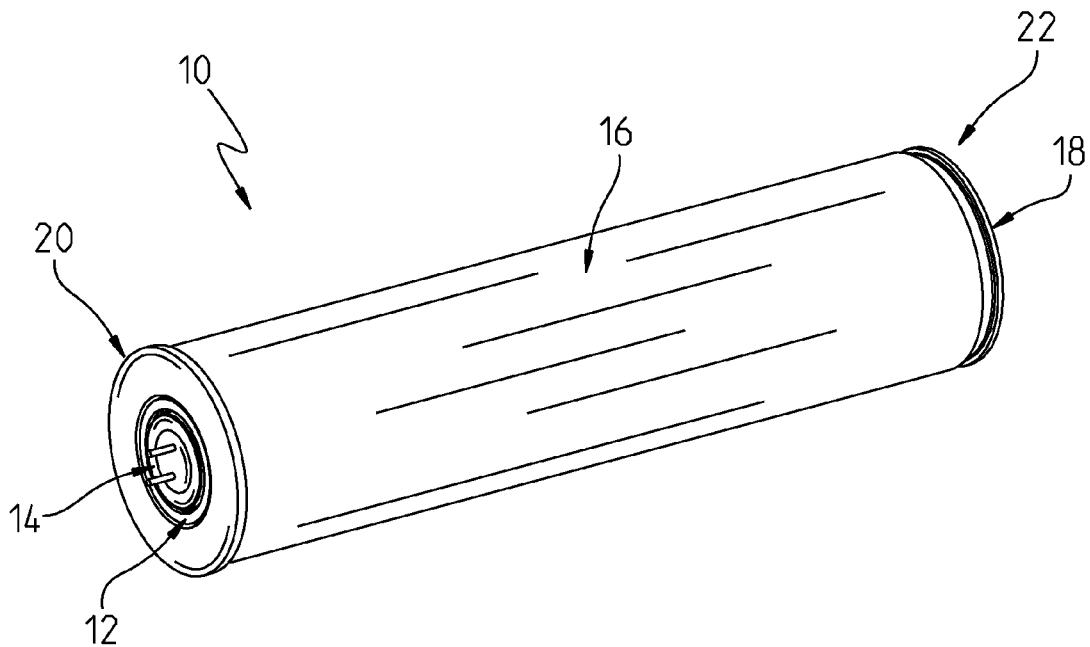
FIG. 1 is a perspective view of an illustrative projectile device with a seal and an impulse cartridge installed therein.
Figure 2:
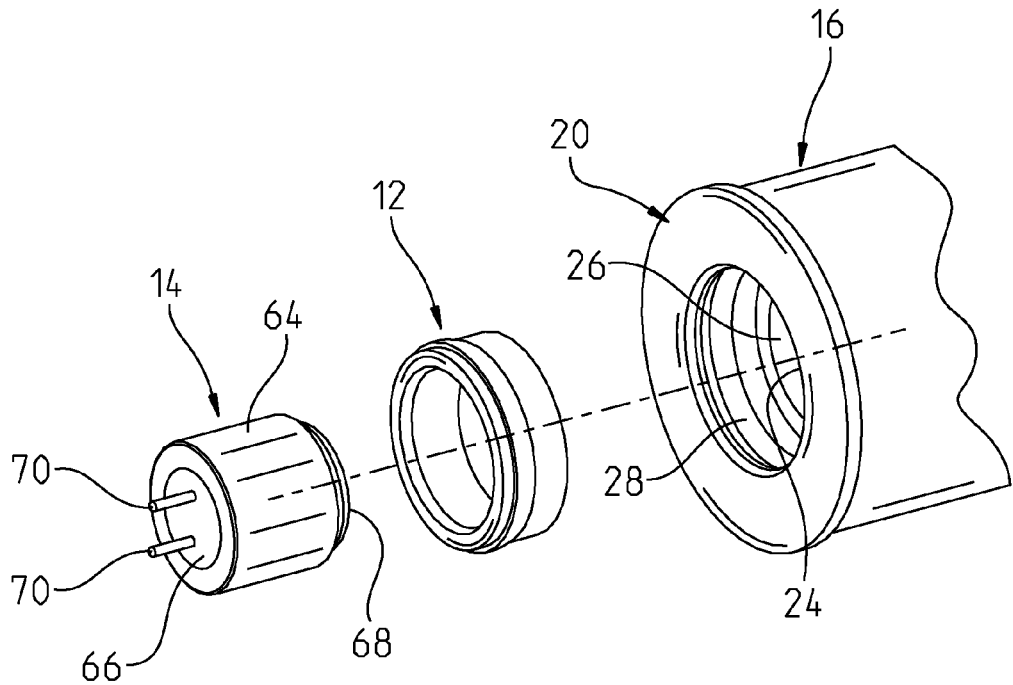
FIG. 2 is an exploded view of a portion of the projectile device, seal, and impulse cartridge of FIG. 1.

FIG. 1 shows projectile device 10 with seal 12 and impulse cartridge 14 installed therein. Projectile device 10 includes housing 16 and end cap 18. Housing 16 is illustratively metallic (such as aluminum), substantially cylindrical, and includes propellant end 20 and ejection end 22.

Propellant end 20 includes bore 24 sized and shaped to receive seal 12 therein. Bore 24 is defined within propellant end 20 as a multi-diametered bore having base wall 26 and side wall 28. Base wall 26 is formed having areas of reduced wall thickness 27 relative to other wall portions such that it forms shear disk 29 that is discussed in more detail below.

Figure 3:
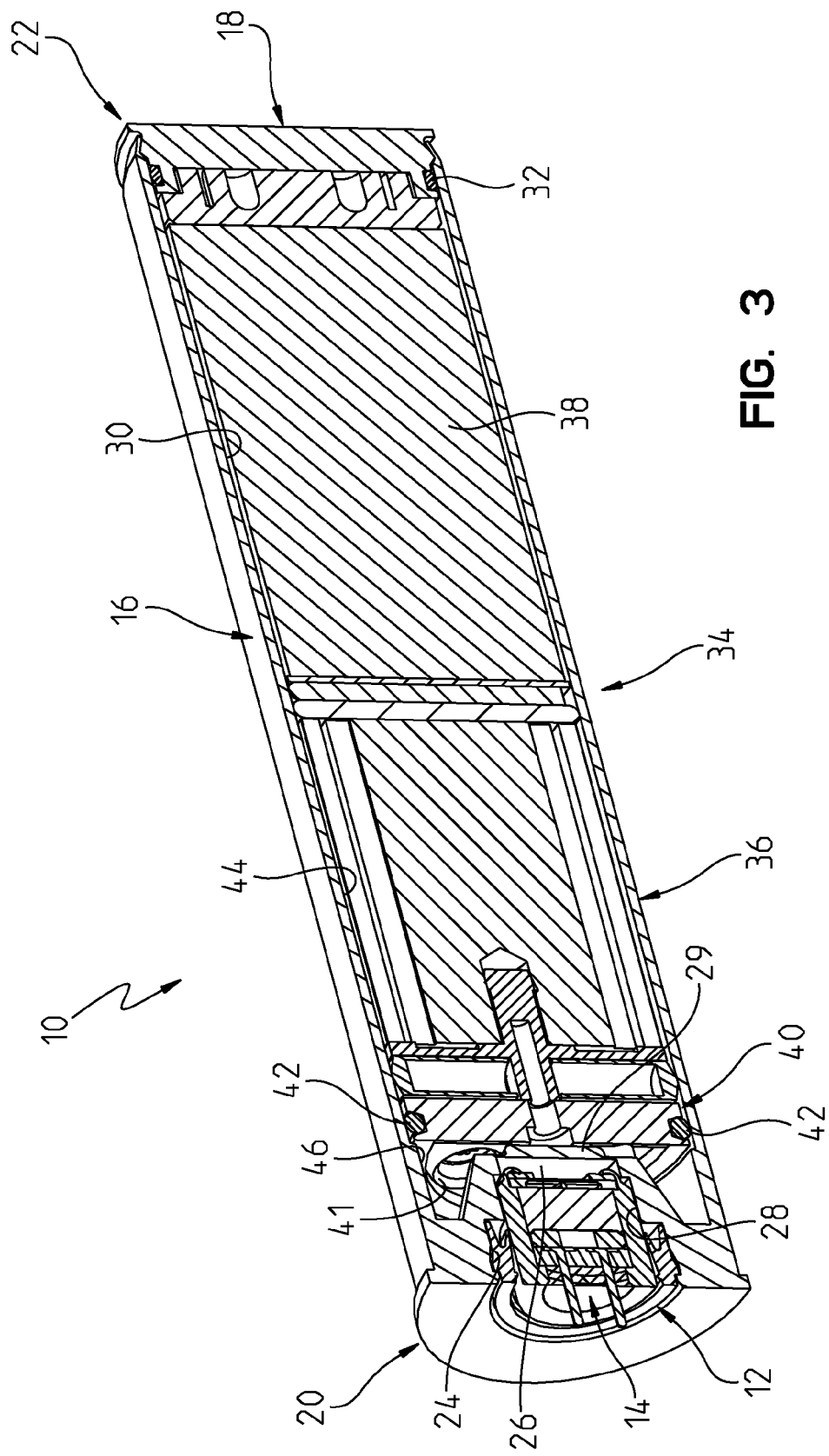
FIG. 3 is a cross-sectional perspective view of the projectile device, seal, and impulse cartridge of FIG. 1.

Ejection end 22 is opposite propellant end 20 and illustratively includes payload bore 30 having a depth that takes up substantially all the length of housing 16 (excluding that portion of the length used to define bore 24 in propellant end 20, see FIG. 3). Payload bore 30 is sized to at least partially receive end cap 18 therein. End cap 18 includes gasket 32 that provides a seal between end cap 18 and the interior wall of payload bore 30.

As shown most clearly in FIG. 3, payload bore 30 illustratively receives multi-component payload 34 therein. Payload 34 includes propellant unit 36 and projectile 38. While the present disclosure shows projectile 38 having multiple components, the concepts of the current disclosure can be used in many projectile accelerating applications and many pressure sealing applications.

Propellant unit 36 includes packing 40. Packing 40 approximates a disc of diameter slightly less than the diameter of payload bore 30. Seal 42 is arranged around packing 40 to create a seal between packing 40 and payload bore 30. In this manner, packing 40 separates payload bore 30 into fore chamber 44 and rear chamber 46. Furthermore, packing 40 serves as a piston head upon which pressure generated in rear chamber 46 can act, as discussed below. Projectile 38 is located in fore chamber 44. Packing 40 may also include bores 41, FIG. 3, that are sized and shaped to receive igniter pellets therein.

Figure 4:
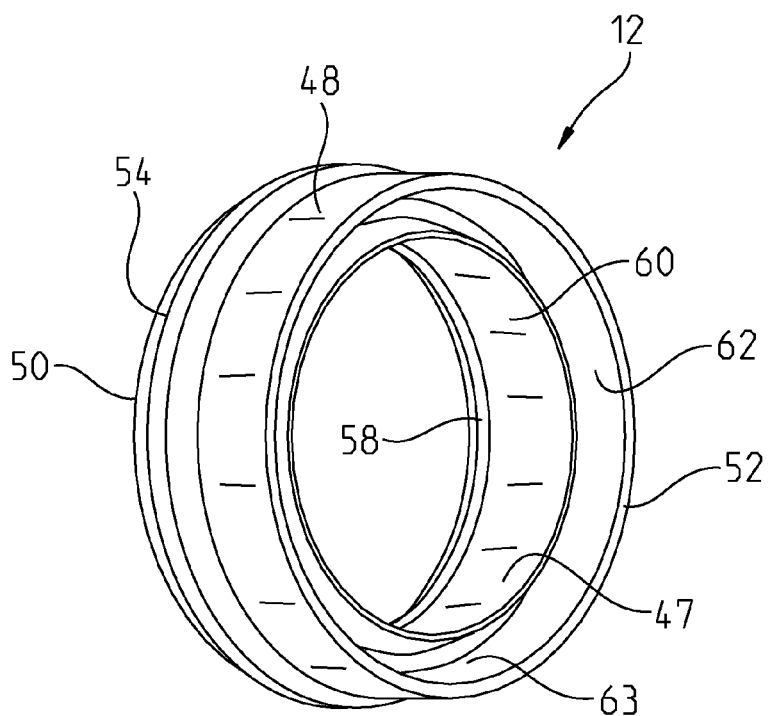
FIG. 4 is a perspective view of a seal utilized between the projectile housing and impulse cartridge as shown in FIG. 2.
Figure 5:
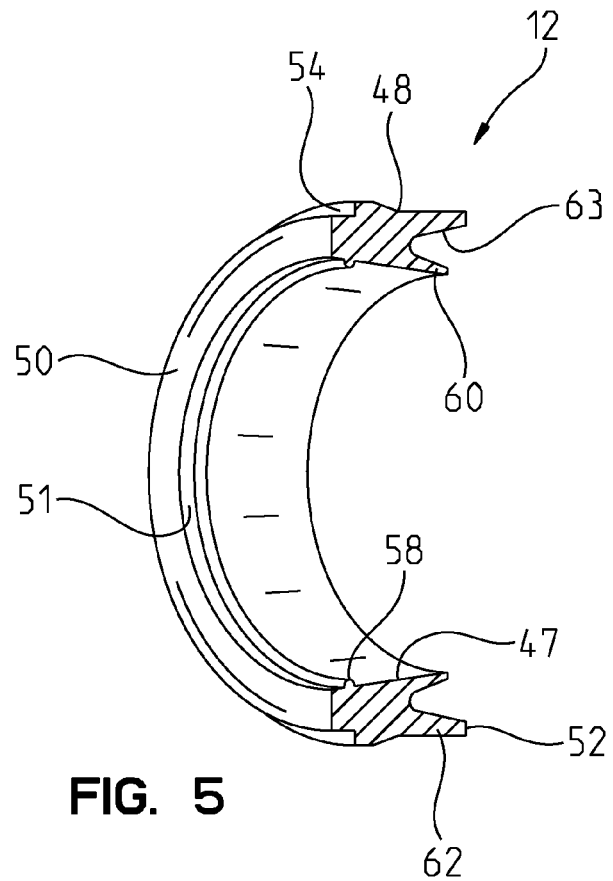
FIG. 5 is a cross-sectional perspective view of the seal of FIG. 4.

Seal 12 is shown most clearly in FIGS. 4 and 5. Seal 12 is illustratively constructed by injection molding of material having flexibility under stress while maintaining overall shape fidelity such as a linear low density polyethylene (LLDPE). One such LLDPE is a narrow molecular weight distribution copolymer, such as Dowlex® 2535 polyethylene resin available from Dow Chemical Company. Seal 12 is annular and includes inner surface 47 having inner diameter and outer surface 48 having outer diameter. The inner diameter is substantially equal to an outer diameter of impulse cartridge 14. The outer diameter of seal 12 is substantially equal to the inner diameter of bore 24.

Additionally, seal 12 includes top side 50 and bottom side 52. Outer surface 48 of top side 50 includes circumferential shoulder 54. When seal 12 is placed within bore 24, shoulder 54 abuts shoulder 56 of bore 24 to retain seal 12 within bore 24. Inner diameter 51 of top side 50 also includes circumferential ledge 58. Ledge 58 is sized and located to act as a pull-ring during the injection molding process.

Bottom side 52 includes a set of annular forked flanges 60, 62. Inner flange 60 forms part of inner surface 47. Outer flange 62 forms part of outer surface 48. Flanges 60, 62 combine to form a "V" shape. It should be appreciated that inner flange 60 is shorter than outer flange 62 such that when bottom side 52 abuts a flat surface, outer flange 62 abuts the surface, but inner flange 60 does not. Inner flange 60 and outer flange 62 combine to define expansion chamber 63 therebetween on bottom side 52 of seal 12. Flanges 60, 62 are thin enough such that they are pliable when force is applied thereto and can deflect under pressure. The thickness of flanges 60, 62 are chosen to elicit a desired deflection profile when pressurized fluid is placed in expansion chamber 63 and also based on the maximum pressure and heat that needs to be withstood while maintaining structural integrity. Furthermore, the thickness of flange 60 is additionally chosen to provide a desired interference fit with impulse cartridge 14 received therein.

Impulse cartridge (I/C) 14 is illustratively an electrically activated impulse cartridge such as model number CCU-136A/A manufactured by Capco, Inc. I/C 14 includes a substantially cylindrical housing 64, pair of electrodes 70 extending from top side 66 of housing 64, and bottom side 68. Housing 64 is illustratively constructed from metal, such as steel. An explosive or pyrotechnic charge 72 is disposed in housing 64 and is ignitable by a high voltage electric signal imposed on electrodes 70. Bottom side 68 is designed to predictably fail to allow the escape of pressurized gas and hot particulate (non-fully combusted fuel).

In assembly, all of the components located in payload bore 30, including end cap 18 are assembled and stored in the assembled condition. Furthermore, seal 12 is placed within bore 24. When seal 12 is placed within bore 24, circumferential shoulder 54 abuts shoulder 56 to retain seal 12 within bore 24. Accordingly, seal 12 is held within bore 24 in a substantially permanent manner (seal 12 is not easily removed without damage being done to seal 12 that would result in a significant degradation of operation thereof).

At some point, such as just before being loaded into a magazine (not shown), impulse cartridge 14 is seated within seal 12. When so placed, inner forked flange 60 abuts cylindrical housing 64. Additionally, bottom side 68 is thereby located proximate base wall 26 of bore 24. However, it should be appreciated that impulse cartridge 14 can readily be separated from housing 16 and seal 12 without harming any of the components. Notably, when a magazine is removed from its receiver and projectiles 10 are removed from the magazine, impulse cartridges 14 are removed from seal 12 and bore 24 to allow storage of projectile 10 having a decreased likelihood of unintentional activation. Accordingly, in an unpressurized (or ambiently pressurized) state, inner flange 60 of seal 12 provides a slight interference fit that imparts a first coefficient of friction on housing 64 that is very low and only slightly discourages I/C 14 from falling out of seal 12 and bore 24. The first coefficient of friction can be easily overcome by an individual or automated process pulling I/C 14 from seal 12 and bore 24.

Figure 7:
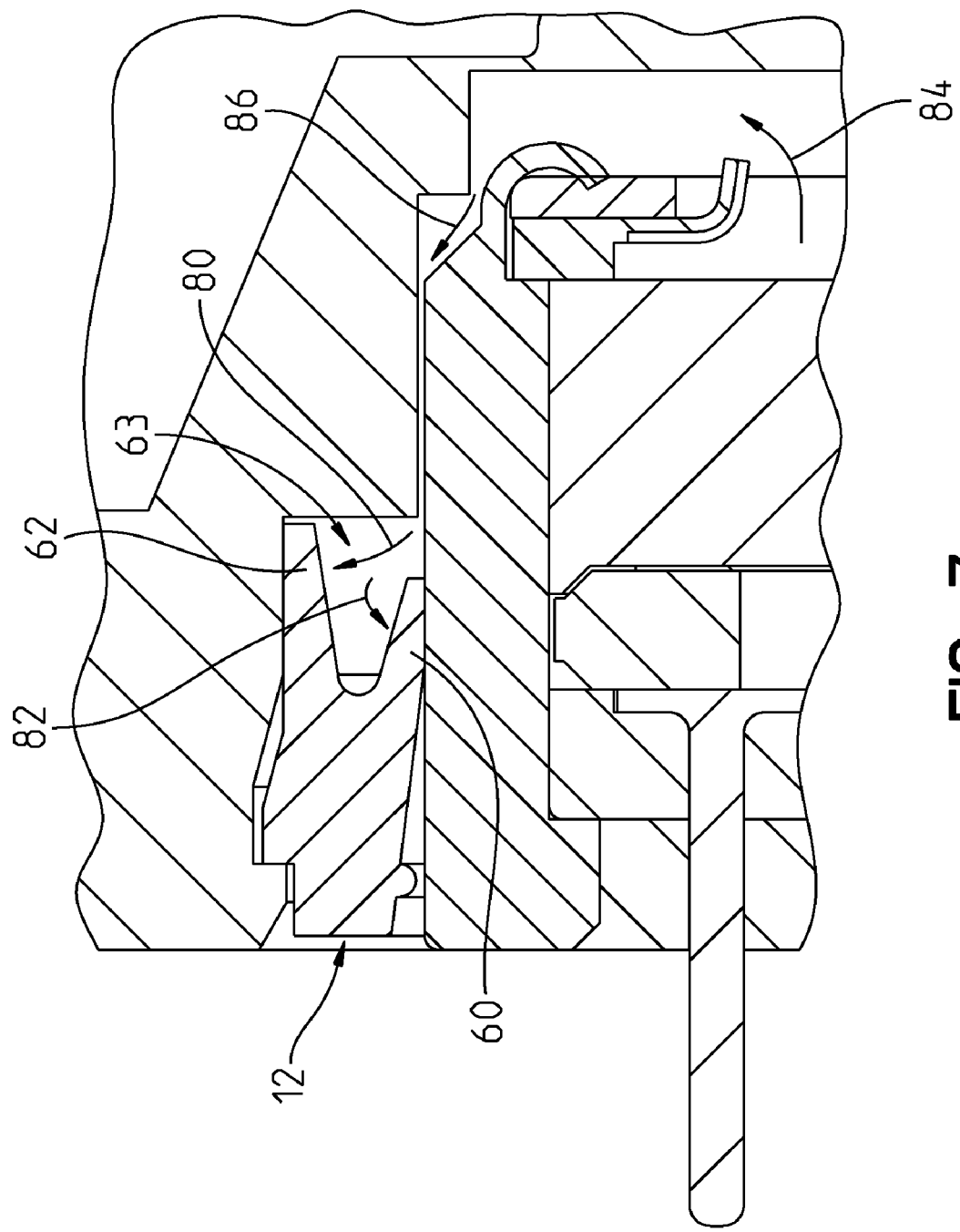
FIG. 7 is a cross-sectional view of a portion of the projectile housing, seal, and impulse cartridge of FIG. 1, during firing.

In use, when properly positioned, end cap 18 is aimed and pair of electrodes 70 are coupled to a voltage source (not shown). When directed, the voltage source imparts a voltage to pair of electrodes 70. The imparted voltage then activates charge 72 causing a rapid gas expansion pressure to be applied to cylindrical housing 64 and bottom side 68. This pressure causes bottom side 68 to predictably fail as shown in FIG. 7. This separation allows the pressurized gas to enter and pressurize, along arrows 84, 86, the portions of bore 24 that are not filled by impulse cartridge 14 and seal 12. Included in the pressurized portions is expansion chamber 63 as shown in FIG. 7. The pressurization of expansion chamber 63 urges flange 62 outwardly against bore 24 (arrow 80) and urges flange 60 inwardly against cylindrical housing 64 (arrow 82). Thus, side wall 28 of bore 24 and cylindrical housing 64 act as seats for seal flanges 60, 62.

Figure 6:
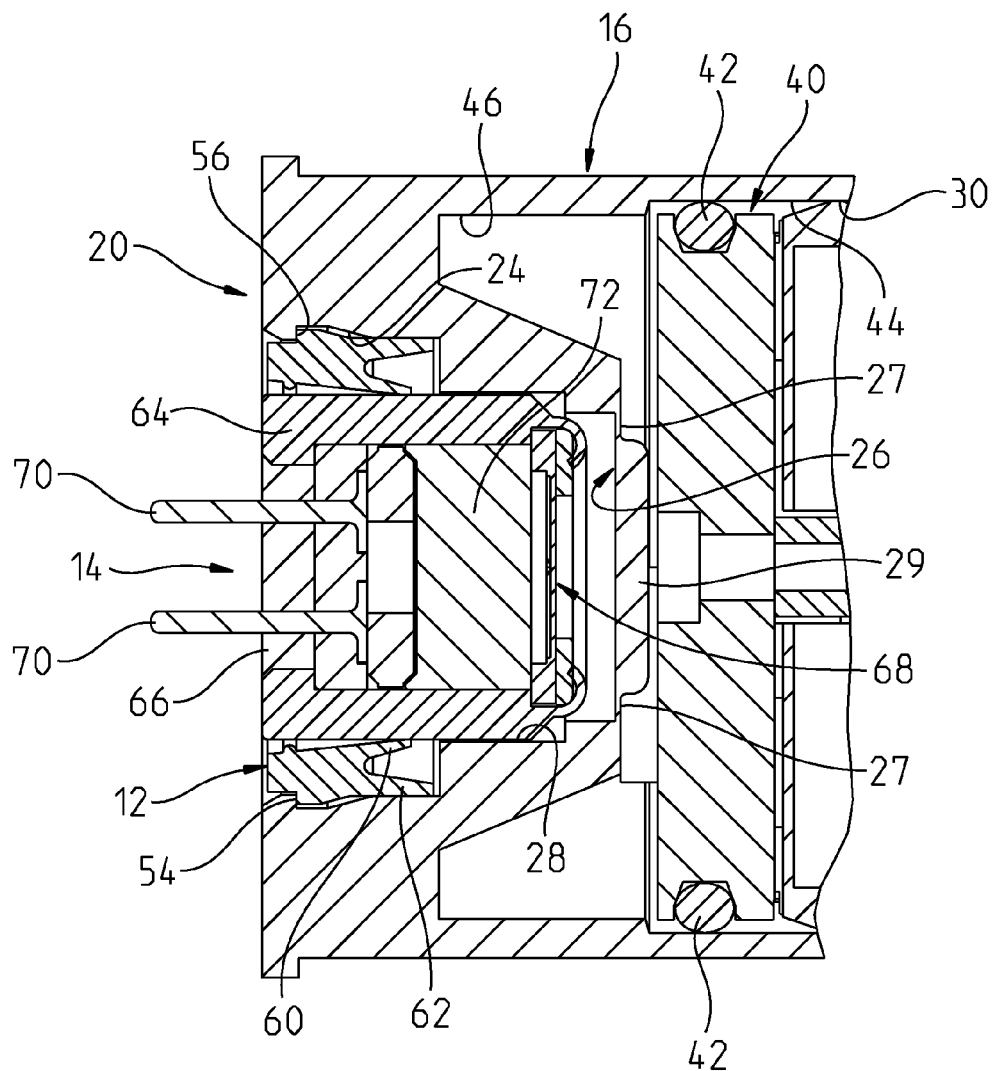
FIG. 6 is a cross-sectional view of a portion of the projectile housing, seal, and impulse cartridge of FIG. 1.
Figure 8:
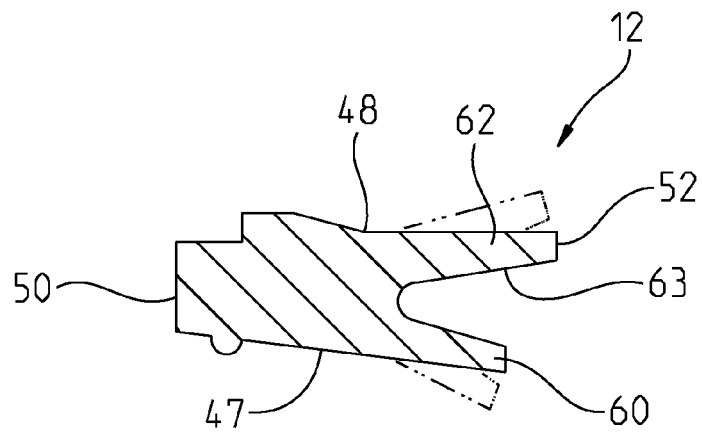
FIG. 8 is a cross-sectional view of the seal of FIG. 4 showing secondary positioning of the flanges.

Accordingly, increased pressure within bore 24 causes increased urging of flange 60 against impulse cartridge 14. More specifically, FIG. 7 shows that a greater portion of flange 60 is pressed into contact with housing 64 than in the unfired condition shown in FIG. 6. FIG. 8 shows the unpressurized "rest" state of seal 12. Additionally, FIG. 8 shows, in phantom, a pressurized "expanded" state that flanges 60, 62 of seal 12 would assume under pressure if not restrained by bore 24 and housing 64. Thus, when bore 24 is unpressurized, impulse cartridge 14 is easily removed due to a relatively low frictional force between the seal 12 and the cartridge 14. However, when bore 24 is pressurized, seal 12 tightly grips impulse cartridge 14 and reduces the likelihood that impulse cartridge 14 is able to exit bore 24. In other words, the frictional force between the seal 12 and the impulse cartridge 14 is greater in the pressurized mode (i.e., when bore 24 is pressurized) than in the unpressurized mode (i.e., when bore 24 is substantially at atmospheric pressure (1 ATM)).

Furthermore, the inward expansion of inner flange 60 against impulse cartridge 14 reduces the existence of pathways for gas loss that may be present between seal 12 and impulse cartridge 14. Similarly, the pressurized gas urges outer flange 62 against side wall 28 of bore 24 thereby reducing the existence of pathways for gas loss that may be present between seal 12 and bore 24. Accordingly, the sealing pressure exerted by flanges 60, 62 against cartridge 14 and bore 24 is directly proportional to the pressure within bore 24. The reduction in pathways between seal 12, impulse cartridge 14, and the side wall 28 provides reduced pathways for soot from activation of impulse cartridge 14 from escaping and coming into contact with the electronic elements that impart voltage to electrodes 70 thereby providing for improved ballistic consistency of projectile 38. A firing of projectile device 10 is expected to generate between 1400-2000 psi within rear chamber 46 and bore 24.

With the pressurized gas urging flanges 60, 62 into compression against impulse cartridge 14 and bore 24 respectively, the gas is effectively trapped within bore 24. When the pressure reaches a critical level, the portions of reduced wall thickness 27 of bore 24 fracture and release shear disk 29. The pressurized gas is then able to expand into rear chamber 46 of payload bore 30. Accordingly, seal 12 is designed so as to reliably function to retain gasses under pressure at least up to the pressure necessary to release shear disk 29. Furthermore, while seal 12 abuts impulse cartridge 14 and bore 24 in both the low and high pressure environments, the high pressure environment does provide for slight deflection of flanges 60, 62 to achieve a more complete seal. The seal 12 is configured to releasably seal pressurized gas within an operational temperature range of −65° F. to +160° F.

Hot particulate (non-fully combusted fuel) from cartridge 14 abuts igniter pellets (not shown) located in bores 41 and cause them to ignite and provide even more pressurized gas within rear chamber 46. As gas accumulates in rear chamber 46 of payload bore 30, packing 40 is urged away from propellant end 20 and towards ejection end 22. This urging results in expelling/deployment of end cap 18 and multi-component payload 34 from payload bore 30.

Accordingly, seal 12, via flanges 60, 62 provides an interface between bore 24 and impulse cartridge 14 that allows relative movement therebetween when flanges 60, 62 are exposed to a low or normal (near 1 ATM) pressure environment for placement and removal of impulse cartridge 14. Seal 12 further provides an interface between bore 24 and impulse cartridge 14 that restricts relative movement therebetween when flanges 60, 62 are exposed to a high pressure environment such as that experienced during firing. Accordingly, while the disclosure has focused on implementations in the area of projectiles and explosives, the seal of the present disclosure should be understood to be applicable to any implementation where high pressure sealing is desired. Furthermore, while the above implementation discusses sealing gasses, the seal can be applied to fluids generally (gasses, liquids, or combinations thereof).

Although the disclosure has been described in detail with reference to certain preferred embodiments, variations and modifications exist within the spirit and scope of the disclosure as described and defined in the following claims.

The invention claimed is:

1. An ejector device including:
a housing having an ignition source receiving bore including a bore wall;
an ejectable device disposed within the housing; and
a seal having an annular forked end exposed to a pressure bore, the forked end having an outer fork and an inner fork, the forks being constructed from a material that permits deflection of the forks when the forks are exposed to high pressure produced from an ignition source placed within the receiving bore, deflection of the forks applying a clamping force against said ignition source that temporarily prevents lateral movement of said ignition source within said ignition source receiving bore up to a first force comprising a force produced by said ignition source;
said outer fork and said inner fork have two different lengths so that said high pressure enters between said outer and inner forks by an opening created by a one of the forks having a shorter length than the other fork;
wherein said inner fork has a thickness adapted to create a light interference fit between said inner fork and said ignition source body such that a slight gripping or friction force is created between said inner fork and said ignition source body to releasably restrict movement of said ignition source within said seal up to a second force;
wherein said receiving bore comprises a first bore section having a first diameter and a second bore section having a second diameter adjacent to said first bore section, said second diameter is less than said first diameter, wherein said seal inserts within said first bore section, wherein, said second bore section has a diameter greater than an outer diameter of said ignition source body such that said high pressure is permitted to pass between an outer section of said ignition source body and said second bore section into a pressure zone within said annular forked end of said seal;
wherein said seal further comprises a first end, a second end, an outer surface, and an inner surface, wherein said annular forked end defines said first end and said second end is on an opposite side of said seal from said first end;
said seal further comprises a circumferential shoulder formed on said outer surface which abuts a receiving shoulder formed into said bore wall to non-destructively retain said seal in place when said ignition source is inserted into and removed from said housing;
wherein said inner surface is further defined by a first diameter and a second diameter as measured by a line through a center axis of said seal from opposing surfaces of said inner surface within said seal, said first diameter line end points are substantially at locations of said inner surface in proximity to where said annular forked end joins to a main body of said seal on said first end, said second diameter line end points are substantially at locations of said inner surface in proximity to a junction of said circumferential shoulder with an adjacent section of said seal where an edge of said circumferential shoulder faces toward said second side, said second diameter being larger than said first diameter and thereby forming a tapering shape to said inner surface that is operable to guide said ignition source as it is inserted into said seal from said second end;

wherein said seal is formed so that only said inner fork is in contact with said ignition source body after said ignition source body is inserted into said seal prior to exposure to said high pressure produced from said ignition source.

2. The device of claim 1, wherein the seal further includes an annular shoulder that abuts a shoulder in the ignition source receiving bore, the abutment of the shoulders preventing the non-destructive removal of the seal from the ignition source receiving bore.

3. The device of claim 1, wherein the seal is shaped as a ring and provides for receiving an impulse cartridge in the center of the ring.

4. The device of claim 1, wherein the bore wall of the housing includes a section of reduced wall thickness, the section of reduced wall thickness being designed to rupture at a first pressure.

5. The device of claim 4, wherein the seal maintains its ability to restrict gas loss from the bore at pressures at least as great as the first pressure.

6. The device of claim 1, further including an ignition source received in said seal within the ignition source receiving bore.

7. The device of claim 1, wherein the seal is constructed from low-linear-density 2535 polyethylene.

8. The device of claim 1, wherein the seal is constructed from materials able to maintain structural integrity of said seal when said inner and outer forks deflect up to 2000 psi.

9. The device as in claim 1, wherein said inner surface further includes a flexible annular protrusion that extends towards said center axis in proximity to an edge of said second end.

10. The device as in claim 1, wherein said seal includes flexible material selected from a group which can substantially prevent pressurized gas from passing between said seal and said first and second bodies within an operational temperature range of −65° F. to +160° F.

* * * * *